United States Patent [19]

Hong et al.

[11] Patent Number: 5,594,811

[45] Date of Patent: Jan. 14, 1997

[54] APPARATUS AND METHOD FOR RECOGNIZING A CHARACTER

[75] Inventors: Zi Quan Hong; Ryohei Kumagai; Tetsuo Ohsiro, all of Tokyo, Japan

[73] Assignee: Yozan, Inc., Tokyo, Japan

[21] Appl. No.: 329,143

[22] Filed: Oct. 25, 1994

Related U.S. Application Data

[63] Continuation of Ser. No. 66,661, May 25, 1993, abandoned.

[30]    Foreign Application Priority Data

May 27, 1992 [JP] Japan .................................. 4-158926

[51] Int. Cl.$^6$ ....................................................... G06K 9/00
[52] U.S. Cl. ........................... 382/216; 382/174; 382/193
[58] Field of Search ............................... 382/16, 28, 36, 382/10, 18, 20, 174, 193, 216

[56] References Cited

U.S. PATENT DOCUMENTS

| | | | |
|---|---|---|---|
| 3,381,274 | 4/1968 | Quade et al. | 382/18 |
| 3,968,475 | 7/1976 | McMahon | 382/18 |
| 4,398,177 | 8/1983 | Bernhardt | 382/18 |
| 4,497,066 | 1/1985 | Gasparri, Jr. | 382/48 |

OTHER PUBLICATIONS

Rosenfeld et al., "Digital Picture Processing", Second Edition, vol. 2, Academic Press, Inc. 1982, pp. 58–66.

*Primary Examiner*—Leo Boudreau
*Assistant Examiner*—Chris Kelley
*Attorney, Agent, or Firm*—Cushman, Darby & Cushman IP Group of Pillsbury Madison & Sutro LLP

[57]    ABSTRACT

A method of recognizing a character including the steps of reading sample characters and generating an image corresponding to the sample characters. Then calculating density projections of each sample characters. A primitive characteristic vector is then extracted from each density projection. Compression then occurs so that an optimal distinction vector and a corresponding characteristic space can be determined. A character to be recognized is then read and an image corresponding to said character to be recognized is generated. A density projection is then made from the image of the character to be recognized. A primitive characteristic vector is then made from the density projection of the character to be recognized. A secondary characteristic vector is then produced by projecting the primitive characteristic vector of the character to be recognized into the compressed characteristic space. Finally one of the sample characters is outputted, based upon the secondary characteristic vector, as the recognized character.

10 Claims, 3 Drawing Sheets

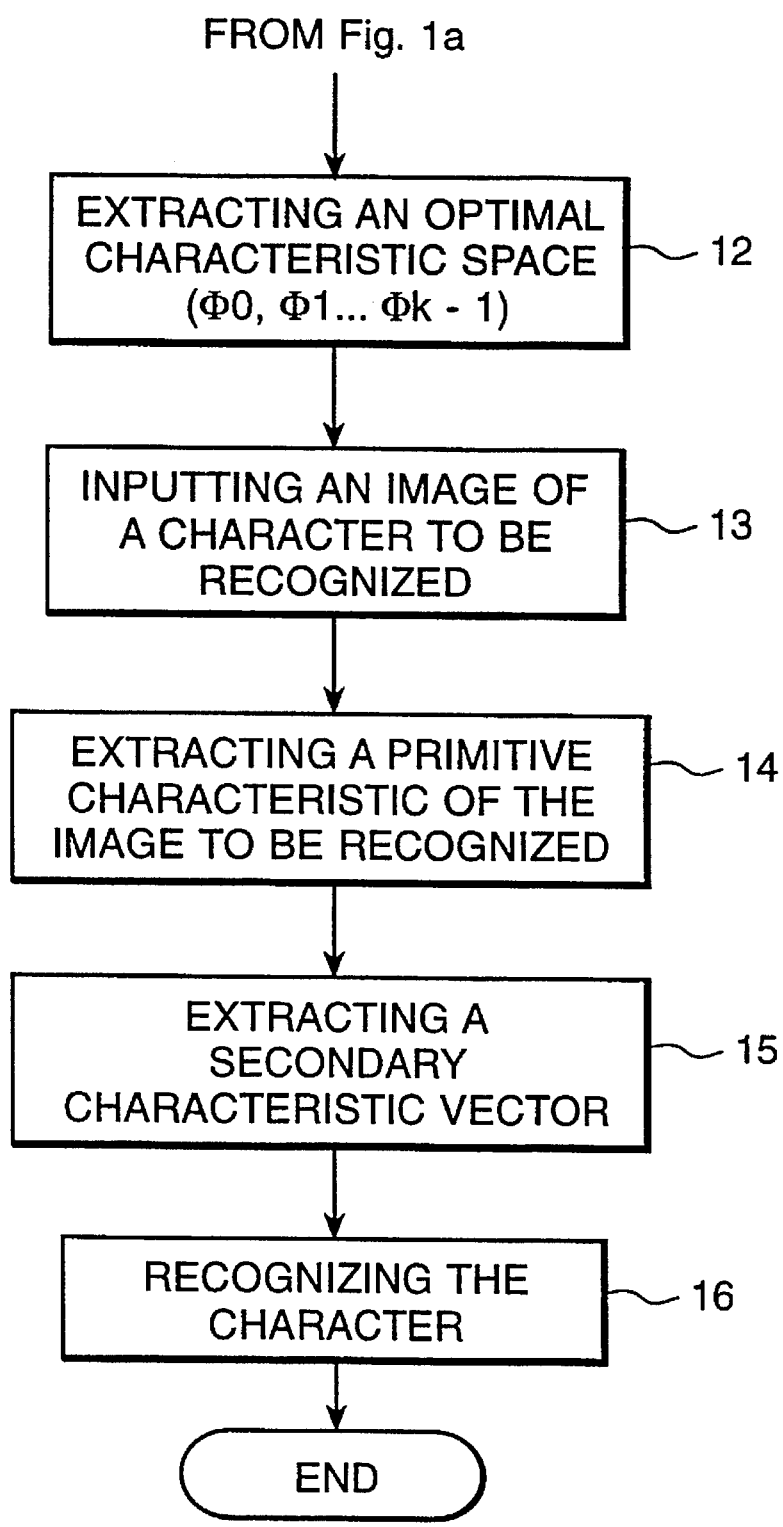

APPARATUS AND METHOD FOR RECOGNIZING A CHARACTER

This is a continuation of application Ser. No. 08/066,661, filed on May 25, 1993, which was abandoned upon the filling hereof.

FIELD OF THE INVENTION

The present invention relates to a method for recognizing characters, for example, recognizing characters according to characteristics information corresponding to the characters.

DESCRIPTION OF THE ART

There is a method of recognizing characters that includes a-step of calculating a density projection by projecting a character taken by a camera on both the X-axis and Y-axis directions. However, information based on a density projection is easily influenced by a relative position between lines composing a character. Also, in the case performing recognition according to a density projection, a large amount of information is needed.

Further, the recognition ratio is low because of the amount of unnecessary information which is contained within the overall information.

SUMMARY OF THE INVENTION

The present invention solves the problems mentioned above and can provide a high recognition ratio through the use of compressed information taken from a density projection.

A method of recognizing characters relating to this invention performs character recognition by calculating a characteristics space which makes an optimal distribution of groups of primitive characteristics vectors, each corresponding to a sample character and obtaining a secondary characteristics vector by projecting each primitive characteristics vector into the characteristics space of the corresponding character, the characteristics of which is to be extracted.

A method of recognizing characters according to the present invention enables recognition of a character based upon more abstract information.

BRIEF DESCRIPTION OF THE DRAWINGS

FIG. 1b is a flow chart showing step 13 to step 16 of an embodiment of the present invention.

FIG. 2b is a diagram showing a density projection for the input image depicted in FIG. 2a.

DETAILED DESCRIPTION OF THE PRESENTLY PREFERRED EXEMPLARY EMBODIMENTS

Figure 1A:
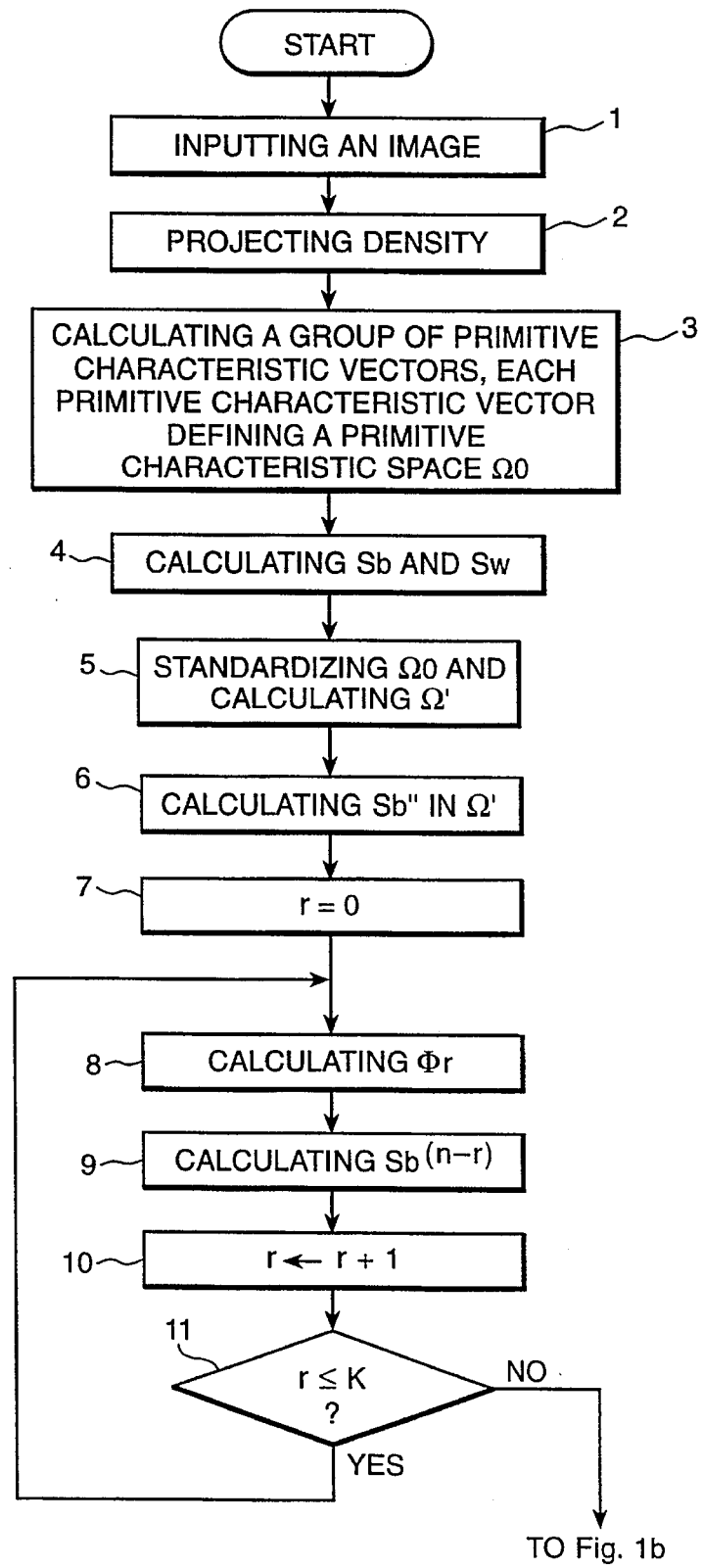
FIG. 1a is a flow chart showing step 1 to step 12 of an embodiment of the present invention.

Hereinafter, an embodiment of a method of recognizing characters according to the present invention is described with reference to the attached drawings. FIGS. 1a and 1b are flow charts of the present invention. At first, a process of making a model of optimal characteristic space (i.e. steps 1–12) is explained.

Figure 2A:
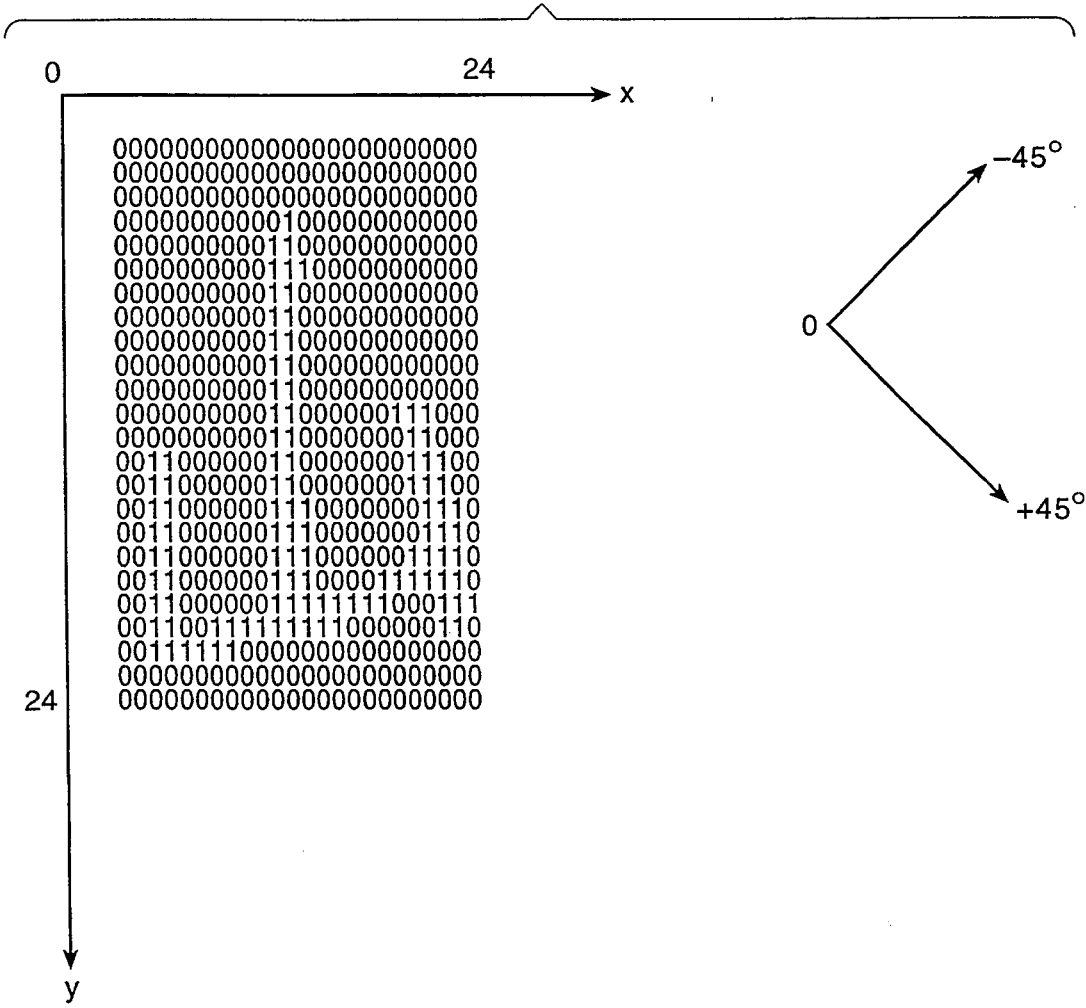
FIG. 2a is a diagram showing a direction of a density projection and an input image.
Figure 2B:
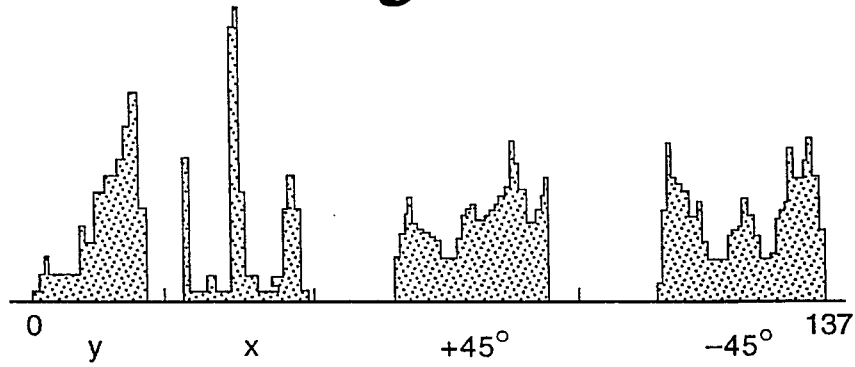

Sample characters are first converted into a predetermined size and input by a camera in step 1. The sample characters are a list of characters which includes a character to be recognized. For example, in the case where there are 5,000 characters and 20 kinds of figures for each character, the number of sample characters will be 100,000. A density projection of the input image of step 1 is calculated in step 2. The density projection is performed in the direction of the X-axis, Y-axis and ±45° (as shown in FIGS. 2a and 2b). As seen in FIG. 2b, the density projection used in this example consists of 138 pixels in total, and a width of 24 pixels along X-axis and Y-axis, and 45 pixels along the ±45° axis.

A primitive characteristic vector is calculated from this density projection. This primitive characteristic vector is a vector based upon the 138 pixels of the density projection. A space defined by this primitive characteristic vector is called a "primitive characteristics space". This processing is performed on each sample character. That is, 20 sample characters are processed for the i-th character, and finally 20 sample characters are processed for the 5,000-th character. A group of primitive characteristics vectors of a sample character is then calculated in step 3.

Next, in step 4, a matrix of co-variances Sw within each group is calculated so that a distribution for each character is obtained, and a matrix of a co-variances Sb between groups is calculated so that a distance between different characters is obtained.

Next, in step 5, a primitive characteristic space $\Omega o$ is normal. That is, a unit matrix I is calculated from Sw. Then in step 6, from the normalized primitive characteristic space $\Omega'$, a new matrix of co-variances Sb" between groups is calculated so that the distance between different characters is calculated. The formula for calculating Sb" is shown below.

$$sb" = (p^{-1})\,^T Sbp^{-1}$$

P=converting matrix

T=transposing operator of a matrix

Next, the normalized characteristic space $\Omega'$ is compressed into a characteristic space having a newly designated dimension. Optimal distinguishing vectors in the dimension $\Phi$ and Sb" are then calculated and an optimal characteristics space is extracted with respect to the newly designated dimension. These steps correspond to steps 7 to 12. In order to extract the optimal distinguishing vector $\Phi$ in step 8, the well-known Fisher's distinctive function is used. The formula for Fisher's distinctive function is shown below.

$$J_F(\Phi) = \Phi T_{sb"} \Phi$$

$J_F$=Fisher's distinctive function $\Phi$=Optimal Distinction Vector

This Fisher's distinctive function is set to be maximum. That is, the vector is calculated, whose matrix of the variance between groups is maximum so that the distance between different characters is maximized, as well as minimizing matrix of the variance within the group. Thus, the distribution in a characters is minimized. Therefore, the vector calculated here is the optimal characteristics distinguishing vector $\Phi$.

$Sb^{(n-r)}$ is calculated in step 9, which is the r-th calculation result of Sb" during the compression process from the characteristics space of 138 pixels to the space newly designated dimension. The formula for $Sb^{(n-r)}$ is shown below.

$$Sb^{(n-r)} = pn-r^T Sb" pn-r$$

pn–r=converting matrix of $\{n \times (n-r)\}$ n=a dimension of the primitive characteristic space r=the number of times compression has occurred Whether r is less than or equal to the number of dimensions of the newly designated characteristics space is judged in step 11. If r is less than or equal to K, the process returns to step 8 because compression is not enough. If r is larger than K, it means compression into the newly designated characteristics space is completed. The process then proceeds to step 12 and extracts the optimal characteristics space within the newly designated dimension.

Next, optimal extraction of characteristics of a character to be recognized and the recognition process are explained with reference to steps 13–16 of FIG. 1*b*. At first, an image of a character to be recognized is inputted in step 13. A density projection is then calculated in step 14, and a primitive characteristic vector of the character to be recognized is extracted. Next, an optimal distinctive characteristics is extracted in step 15. That is, a secondary characteristic vector is calculated by projecting the primitive characteristics vector of the character to be recognized into the optimal characteristics space which was calculated in step 12.

In step 16, in order to recognize which character corresponds to the secondary characteristic vector obtained in step 15, the secondary characteristics vector is input into the following formula.

$D_i(a) = -\ln|C_i| - \{(a-a_i)^T C_i^{-1} (a-b_i)\}$ $i = 1, 2, \ldots, c$ $a$ = a secondary characteristics vector of a character $c$ = the number of different characters $C_i$ = sample of a variance matrix in the optimal characteristic space $\Omega$ of the i-th character.

$b_i$ = sample of the mean vector in the optimal characteristic space $\Omega$ of the i-th character.

$T$ = transposing operator $C_i^{-1}$ = inverted matrix of matrix Ci

If the result of the calculation of this formula is 100, the character to be recognized is regarded as the 100th character which was processed in step 2, for example.

In a recognition experiment using the printed sample character of E, T, L and 2, when an optimal distinguishing vector having a dimension of 11 pixels is used, it is possible to recognize characters with a highly successful ratio of 99,524%.

As mentioned above, according to the present invention, even though a small amount of compressed information is used, high recognizing ratio can still be obtained.

What is claimed is:

1. A method of recognizing a character by use of a computer, the method comprising the steps of:

causing said computer to perform a pre-recognition process, whereby a model of an optimal characteristic space is created, said pre-recognition process including:

causing an electronic image generator to transform sample characters that are contained on a first object into a first image, using said computer to generate a plurality of first density projections from said first image, each first density projection corresponding to one of said sample characters, using said computer to extract a first primitive characteristic vector from each said first density projection, and using said computer to generate, based upon an optimal distinction vector, a second characteristic space having a second dimension, said optimal distinction vector being determined by an optimal distribution of groups of said first primitive characteristic vectors; and causing said computer to perform a character recognition process, said character recognition process including:

causing said electronic image generator to transform a character to be recognized that is contained on a second object into a second image, using said computer to generate a second density projection from said second image, using said computer to extract a second primitive characteristic vector from said second density projection, using said computer to generate a secondary characteristic vector by projecting said second primitive characteristic vector into said second characteristic space, and causing said computer to associate, based upon said secondary characteristic vector, one of said sample characters with said recognized character.

2. A method of recognizing a character according to claim 1, wherein said first density projections and said second density projection are generated by said computer with respect to a vertical, a horizontal, and an inclined direction.

3. A method of recognizing a character according to claim 1, wherein said first density projections and said second density projection are generated by said computer with respect to an inclined direction of ±45° and −45°.

4. A method of recognizing a character according to claim 1, wherein said secondary characteristic vector is generated by said computer by compressing said second primitive characteristic vector with a converter matrix.

5. A method of recognizing a character according to claim 1, wherein said first primitive characteristic vectors have a first characteristic space, the first characteristic space has a first dimension, optimal distribution of said groups of said first primitive characteristic vectors is generated by causing said computer to repeatedly compress said first characteristic space until the number of compressions is greater than or equal to a third dimension of a new characteristic space.

6. An apparatus for recognizing a character comprising:

an electronic image generator that is constructed and arranged to:

read sample characters, generate a first image corresponding to said sample characters, read a character to be recognized, and generate a second image corresponding to said character to be recognized; and a computer that is constructed and arranged to associate, based upon a secondary characteristic vector, one of said sample characters with a said character to be recognized, wherein said computer is programmed to:

generate a plurality of first density projections of said first image, each first density projection corresponding to one of said sample characters, extract a first primitive characteristic vector from each said first density projection, generate, based upon an optimal distinction vector, a second characteristic space having a second dimension, said optimal distinction vector being determined by an optimal distribution of groups of said first primitive characteristic vectors, generate a second density projection from said second image, extract a second primitive characteristic vector from said second density projection, and generate said secondary characteristic vector by projecting said second primitive characteristic vector into said second characteristic space.

7. An apparatus for recognizing a character according to claim 6, wherein said computer is programmed to generate said first density projections and said second density projection with respect to a vertical, a horizontal, and an inclined direction.

8. An apparatus for recognizing a character according to claim 6, wherein said computer is programmed to generate said first density projections and said second density projection with respect to an inclined direction of ±45° and −45°.

9. An apparatus for recognizing a character according to claim 6, wherein said computer is programmed to generate said secondary characteristic by compressing said second primitive characteristic vector with a converter matrix.

10. An apparatus for recognizing a character according to claim 6, wherein said first primitive characteristic vectors have a first characteristic space, the first characteristic space has a first dimension, optimal distribution of said groups of said first primitive characteristic vectors is determined by programming said computer to repeatedly compress said first characteristic space until the number of compressions is greater than or equal to a third dimension of a new characteristic space.

* * * * *